March 11, 1969  T. R. HUNT  3,432,836

METHOD FOR MAGNETIC CORE READOUT WITH NOISE CANCELLATION

Filed May 28, 1965

INVENTOR.
TYLER R. HUNT
BY A.H. Oldham
ATTORNEY

United States Patent Office 3,432,836
Patented Mar. 11, 1969

3,432,836
METHOD FOR MAGNETIC CORE READOUT WITH NOISE CANCELLATION
Tyler R. Hunt, Stow, Ohio, assignor to Goodyear Aerospace Corporation, Akron, Ohio, a corporation of Delaware
Filed May 28, 1965, Ser. No. 459,796
U.S. Cl. 340—174                              3 Claims
Int. Cl. G11b 5/00

ABSTRACT OF THE DISCLOSURE

A method and apparatus for magnetic core readout with noise cancellation. Specifically, readout of a single aperture core utilizing elastic switching techniques is combined with a second core associated therewith set so as to be driven towards complete saturation upon readout to greatly improve signal to noise ratios over that possible with the single core alone.

---

Figure 1:
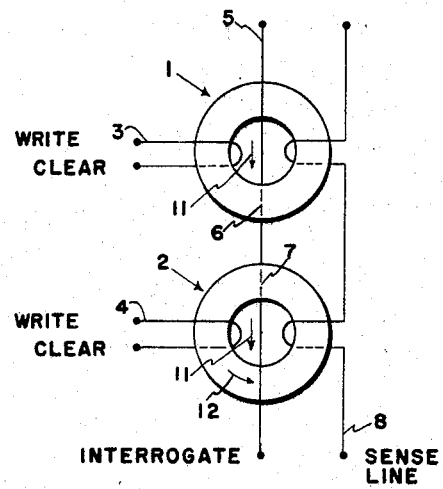

This invention relates to a method and apparatus for magnetic core readout with noise concellation, and more particularly to readout of a single aperture core utilizing elastic switching techniques with a second core associated therewith to provide the noise cancellation feature.

Patent application Ser. No. 280,602 for "An Associative Memory Apparatus and Method Using Elastic Switching Storage Elements," filed May 15, 1963, and now U.S. Patent No. 3,300,761, defines the technique of elastic switching to provide non-destructive readout for single aperture magnetic core elements. Essentially, this elastic switching technique involves sending an interrogate current pulse through a wire passing through the aperture of the core, which pulse will be of a fairly large magnitude so that it exceeds the coercive force of the core by a factor of 5 to 10 depending upon the type of material, but with the duration of the pulse being very short, say 50 nanoseconds, which thus prevents any permanent switching in the core from taking place. Essentially what happens is that the flux in the core is driven towards a changing condition on the hysteresis curve representing the flux pattern in the core, but is stopped short of the point where permanent change might take place. Because of the elastic quality of the flux pattern stored in the core, it will bounce back to its original stable flux position after the short duration high current pulse has terminated. This phenomenon is well explained in the above-identified patent application. However, it has been found that utilizing this technique for non-destructive readout of single aperture magnetic cores will only achieve signal to noise ratios in the order of 2 or 3 to 1. It becomes exceedingly difficult to work with signal to noise ratios in this low area, and hence a need arises to improve the signal to noise ratios in non-destructive readout of single aperture magnetic cores.

Therefore, it is the general object of the present invention to meet the needs of the art by providing a method to achieve non-destructive readout of a single aperture magnetic core where signal to noise ratios can be increased to the order of more than 40 to 1 by simply providing a second core associated with the information bit storing core to cancel noises generated upon the short duration high energy interrogate pulse.

A further object of the invention is to provide a pair of single aperture magnetic cores functioning together where one core acts as the information storage element and the other core acts as the noise cancellation component so that when both are read out by a common interrogate pulse in opposite sense, the noises generated in one core will be cancelled by the other thereby achieving a high signal to noise ratio.

A further object of the invention is to provide a pair of cores which operate in coordination with one core storing information and the other core acting to cancel noises generated upon readout using elastic switching techniques where the signal to noise ratio is increased by applying a steady magnetic field to both cores by threading them with a DC current which produces magnetomotive forces less than the coercive forces of the core.

The aforesaid objects of the invention and other objects which will become apparent as the description proceeds are achieved by providing a method for providing readout of a single aperture magnetic permeable core with increased signal to noise ratio which comprises the steps of positioning two single aperture magnetic permeable cores in substantially adjacent relationship, setting flux patterns in one core to represent a bit of information and the other in a known direction, passing a current through a line common to both cores but in opposite sense whereby the other core is driven towards saturation, and sensing manner to both cores. The apparatus of the invention comprises a pair of magnetic permeable cores, means to induce flux patterns in desired directions around the cores to represent stored bits of information, an interrogate line passed through the aperture of each core in opposite sense, means to pulse a high current short duration interrogate pulse through the interrogate line, and means to simultaneously sense the flux change in the cores and to effect readout thereof in series.

Figure 2:
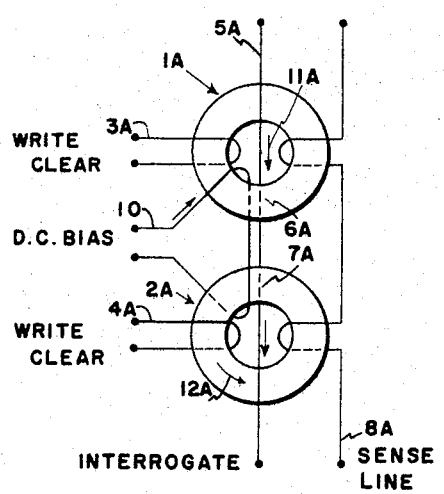
Figure 3:
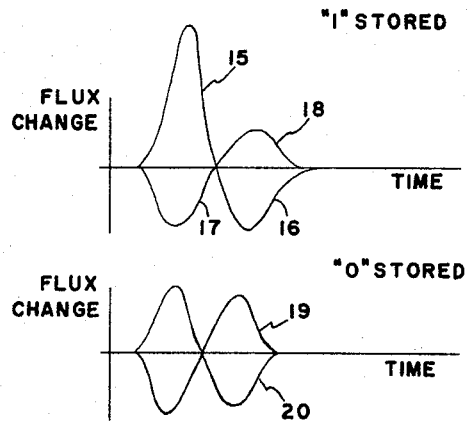
Figure 4:
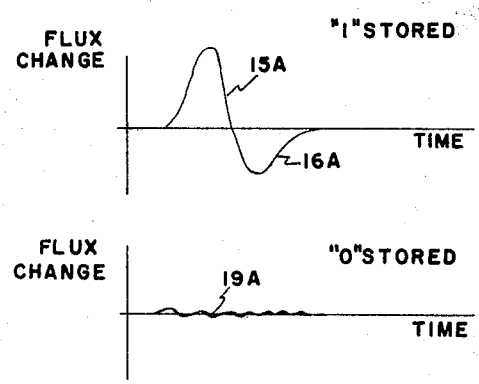

For a better understanding of the invention reference should be had to the accompanying drawings wherein:

FIGURE 1 is a schematic representation of two cores connected with appropriate wiring to perform the noise cancellation features of the invention;

FIGURE 2 is a schematic drawing similar to FIGURE 1 including the DC bias common to both cores to further enhance signal to noise ratios; and FIGURE 3 is a graphic illustration of how the noise portion inherent with every elastic switching readout operation is cancelled by utilizing the associated cancellation core; and FIGURE 4 is a graphic illustration of the final pulses resultant utilizing the associated cancellation core.

While it should be understood that the principles and method of the invention may be applicable to certain multi-aperture cores, or certain other non-destructive readout techniques, it is thought to be most appropriate for readout of single aperture cores utilizing the non-destructive elastic readout technique, and hence it has been so illustrated and will be so described.

With reference to the form of the invention illustrated in FIGURE 1 of the drawings, the numeral 1 indicates generally a magnetic permeable single aperture memory storage core, while the numeral 2 indicates generally a magnetic permeable single aperture noise cancellation core. A write/clear line 3 is provided to pass through the aperture of the core 1 and carry currents to set flux patterns in desired directions around the aperture of the core 1. Likewise, a write/clear line 4 is provided in the same manner for the core 2. An interrogate line 5 is provided common to both cores 1 and 2 except that it passes through the core 1 from top to bottom and through the core 2 from bottom to top, as most clearly indicated by the dotted line portions 6 and 7. Thus, it might be said that the interrogate line 5 is set in opposite sense with relation to the cores 1 and 2. A short duration high energy current pulse passed through the interrogate line 5 will provide the elastic switching technique to be more fully described hereinafter. A sense line 8 is passed through each of the cores in the same manner and in effect connects both cores 1 and 2 in series FIGURE 2 is similar to FIGURE 1, and like numerals with the suffix A have been utilized to designate the same or corresponding parts. However, FIGURE 2 also includes a DC bias line 10 which is adapted to pass a DC current therethrough in the same direction through both cores to produce a magnetomotive force less than the coercive force of the core. This permanent DC bias helps increase the signal to noise ratio attainable utilizing the elastic switching technique. In effect the DC bias is applied to induce flux which will oppose the flux which will be induced by the interrogate line 5A. This then is the amplifying or intensifying technique achieved by utilizing the DC bias.

The invention contemplates that the direction of current passed through the interrogate lines 5 and 5A of FIGURES 1 and 2 will always be in the same direction which might be considered in a downward direction, as indicated by the arrows 11 and 11A in FIGURES 1 and 2. If this current pulse will always be in a downward direction, the flux pattern stored in the noise cancellation cores 2 and 2A will always be in such a direction that the flux pattern induced by the current through the interrogate lines 5 and 5A will be in a direction to tend to further saturate the cores. In other words, using the right hand rule, with the current passing through lines 5 and 5A in a direction indicated by the arrows 11 and 11A, it can be seen that the write/clear lines 4 and 4A should have previously set the flux pattern stored in the cores 2 and 2A in a counter-clockwise direction as indicated by the arrows 12 and 12A. This means that the interrogate pulse will only tend to drive the cancellation cores 2 and 2A further towards saturation.

Now, in order to understand the noise cancellation features of the invention reference should be had to FIGURE 3, wherein the top graph indicates a ONE stored in the memory storage cores 1 and 1A, which would be a flux pattern in the counter-clockwise direction. The flux induced by the interrogate pulse will be in a clockwise direction, or with the tendency to change the path of flux around the core. This causes the core to attempt a switch driving its stable position on the hysteresis curve downwardly causing a very large amount of voltage to be induced into the sense windings 8 and 8A. This large flux change is indicated by the large pulse 15 in FIGURE 3. Since, however, as stated above, elastic switching is being utilized, the termination of the interrogate current pulse causes the core to elastically return to its original level. The characteristic tail appears at this time, which is indicated by the downwardly directed curve portion 16. In a similar manner, the interrogate current pulse will cause the noise cancellation 2 or 2A to drive towards saturation which will be in an opposite direction causing a small downward curve indicated by numeral 17. Again, as the current is terminated this core will return to its initial flux level again causing an equal and correspondingly opposite noise pulse 18. With a "1" stored, the large output from 1 and 1A will give an override to the small output from 2 and 2A thus giving a resultant large output signal 15A, as seen in FIGURE 4, with the characteristic noise tail 16A.

The bottom half of FIGURE 3 illustrates a ZERO stored in the memory elements 1 and 1A which is again interrogated by a downward pulse through the interrogate lines. In this instance, the memory cores 1 and 1A will both be driven towards the saturation point so that we will have equal and opposite curves, each indicated generally by numerals 19 and 20 respectively which completely cancel each other so that only a small disturbance which will be regarded as noise will be observed on the sense lines 8 and 8A such as the line 19A as seen in FIGURE 4. Therefore, we see that the path of flux stored in the memory cores 1 and 1A determines whether or not a signal will be read out on the sense lines 8 and 8A. Thus, a great increase in the signal to noise ratio as measured on the sense line 8 is observed because of the cancellation of the noise pulses 16 and 18. As stated above this phenomenon enables signal to noise ratios utilizing elastic switching techniques in a non-destructive readout to be increased to about 40 to 1 over the best previous signal to noise ratios of about 3 to 1.

It is seen that the invention resides in providing every bit in memory with two cores. One core, which may be considered the cancellation core, is set to a given state so that it will always be pushed towards the saturation level when interrogated with the interrogation pulse. The other core, which may be considered the memory element or memory storage core, is set to either a ONE or ZERO state depending upon the desired state necessary for memory storage purposes. The interrogate wire threads both cores in such a way that the interrogate current passes through the cores in opposite directions to one another. The direction of this current is seen individually by each core. Each core is also linked by a serious wound sense line in the same manner. A current pulse passed through the interrogate line provides the elastic switching mode. That is, this current pulse will exceed the coercive force of each core by a factor of about 5 to 10, as dependent upon the type of material in the core, but the duration of the pulse will be very short, in the vicinity of 25 to 100 nanoseconds, thus preventing permanent flux switching in the core from taking place.

Normal signal-to-noise ratios obtained from a single core utilizing elastic switching techniques usually range in the order of 2 to 1 to 3 to 1. In the instance with the two cores, however, as shown in FIGURE 3, the cancellation core will produce a noise voltage which is exactly cancelled by the noise voltage in the memory storage core. If the information core is in the ZERO state it will produce a small saturation voltage and a noise voltage which will be exactly cancelled by the saturation voltage and noise voltage in the cancellation core. If the information core is in the ONE state, however, it will produce a large voltage which will override the cancellation core noise voltage. Utilization of the steady magnetic field applied to both cores by threading them with a DC current of less magnetomotive force than necessary to change the coercive forces of the core will allow this signal to noise ratio to be increased to the vicinity of about 40 to 1.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. A method for providing readout of a single aperture magnetic permeable core with increased signal to noise ratio which comprises the steps of
  representing a bit of information as a substantially fully saturated flux pattern in a known direction around the aperture of a first core,
  interrogating by non-destructive elastic switching techniques the bit of information stored in the first core by subjecting the core to a high magnitude, short duration pulse external magnetic field in a known direction through the aperture of the core,
  simultaneously interrogating by elastic switching techniques a second core having a substantially fully saturated flux pattern therearound with the same magnetic field passed therethrough in an opposite sense so as always to drive the core towards more complete saturation, and
  sensing the flux change in each core as a current induced on a wire connecting said cores in series whereby oppositely directed currents will be cancelled.
2. A method according to claim 1 where a permanent DC magnetic bias is applied to both cores to enhance the interrogation thereof by elastic switching techniques, said bias having a magnetomotive force less than the coercive force of the cores.

3. A method for providing readout of a single aperture magnetic permeable core with increased signal to noise ratio which comprises the steps of
  positioning two single aperture magnetic permeable cores in substantially adjacent relationship,
  setting substantially fully saturated flux patterns in one core to represent a bit of information and in the other in a known direction,
  passing a current of high magnitude and short duration insufficient to effect any permanent flux switching through a line common to both cores but in opposite sense whereby the other core is driven towards more than complete saturation, and
  sensing the current induced into a sense line common in the same manner to both cores.

References Cited
UNITED STATES PATENTS

| | | | |
|---|---|---|---|
| 3,126,534 | 3/1964 | Siegle | 340—174 |
| 3,115,619 | 12/1963 | Barrett et al. | 340—174 |

JAMES W. MOFFITT, *Primary Examiner.*